(12) United States Patent
Yuan et al.

(10) Patent No.: US 6,387,465 B1
(45) Date of Patent: May 14, 2002

(54) IMAGABLE SEAMED BELTS HAVING FLUOROPOLYMER OVERCOAT

(75) Inventors: Xiaoying (Elizabeth) Yuan, Fairport; Nancy Y. Jia, Webster; Kock-Yee Law, Penfield, all of NY (US)

(73) Assignee: Xerox Corporation, Stamford, CT (US)

( * ) Notice: Subject to any disclaimer, the term of this patent is extended or adjusted under 35 U.S.C. 154(b) by 92 days.

(21) Appl. No.: 09/660,248

(22) Filed: Sep. 13, 2000

(51) Int. Cl.⁷ .................................................. B32B 3/00
(52) U.S. Cl. .......................................... 428/58; 474/254
(58) Field of Search ..................... 428/58, 57; 474/254, 474/253

(56) References Cited

U.S. PATENT DOCUMENTS

| | | | |
|---|---|---|---|
| 5,487,707 A | 1/1996 | Sharf et al. | 474/253 |
| 5,514,436 A | 5/1996 | Schlueter, Jr. et al. | 428/57 |
| 5,549,193 A | 8/1996 | Schlueter, Jr. et al. | 198/844.2 |
| 5,721,032 A | 2/1998 | Parker et al. | 428/57 |

*Primary Examiner*—Alexander S. Thomas
(74) *Attorney, Agent, or Firm*—Annette L. Bade

(57) ABSTRACT

A seamed flexible belt having a fluoropolymer overcoat over interlocking mutually mating elements of the seam for use in the xerographic, contact electrostatic, digital and other like machines.

30 Claims, 8 Drawing Sheets

IMAGABLE SEAMED BELTS HAVING FLUOROPOLYMER OVERCOAT

CROSS REFERENCE TO RELATED APPLICATIONS

Attention is directed U.S. patent application Ser. No. 09/004,636 entitled "Process and Apparatus for Producing an Endless Seamed Belt;" abandoned U.S. Pat. No. 6,183,223, filed Jan. 28, 2000, entitled "Process and Apparatus for Producing an Endless Seamed Belt;" U.S. patent application Ser. No. 09/470,931, filed Dec. 22, 1999, entitled, "Continuous Process for Manufacturing Imagable Seamed Belts for Printers;" U.S. Pat. No. 6,316,070, filed May 28, 1998, entitled, "Unsaturated Carbonate Adhesives for Component Seams." The disclosures of each of these references are hereby incorporated by reference in their entirety.

BACKGROUND OF THE INVENTION

The present invention is directed to an endless flexible seamed belt wherein an image can be transferred at the seam of the belt with little or no print defects caused by the seam. In embodiments, the present invention relates to xerographic component imagable seamed belts comprising a seam formed between mutually mating elements, and having an overcoat on the seam. The overcoat comprises a fluoropolymer material. In a particularly preferred embodiment, a fluoropolymer adhesive binds the seam. The present invention, in embodiments, provides a belt in which the seam has compatible electrical and release properties with the rest of the belt. The present invention further provides, in embodiments, a belt having a seam with increased strength. The present invention, in embodiments, also provides a belt having a seam in which the height differential between the seam and the rest of the belt is virtually nil. The belt, in embodiments, allows for image transfer at the seam, which cannot be accomplished with known seamed belts.

In a typical electrostatographic reproducing apparatus such as an electrophotographic imaging system using a photosensitive member, a light image of an original to be copied is recorded in the form of an electrostatic latent image upon a photosensitive member and the latent image is subsequently rendered visible by the application of a developer mixture. One type of developer used in such printing machines is a liquid developer comprising a liquid carrier having toner particles dispersed therein. Generally, the toner is made up of resin and a suitable colorant such as a dye or pigment. Conventional charge director compounds may also be present. The liquid developer material is brought into contact with the electrostatic latent image and the colored toner particles are deposited thereon in image configuration.

The developed toner image recorded on the imaging member is transferred to an image receiving substrate such as paper via a transfer member. The toner particles may be transferred by heat and/or pressure to a transfer member, or more commonly, the toner image particles may be electrostatically transferred to the transfer member by means of an electrical potential between the imaging member and the transfer member. After the toner has been transferred to the transfer member, it is then transferred to the image receiving substrate, for example by contacting the substrate with the toner image on the transfer member under heat and/or pressure.

Transfer members enable high throughput at modest process speeds. In four-color photocopier or printer systems, the transfer member also improves registration of the final color toner image. In such systems, the four component colors of cyan, yellow, magenta and black may be synchronously developed onto one or more imaging members and transferred in registration onto a transfer member at a transfer station.

In electrostatographic printing and photocopy machines in which the toner image is transferred from the transfer member to the image receiving substrate, it is desired that the transfer of the toner particles from the transfer member to the image receiving substrate be substantially 100 percent. Less than complete transfer to the image receiving substrate results in image degradation and low resolution. Complete transfer is particularly desirable when the imaging process involves generating full color images since undesirable color deterioration in the final colors can occur when the color images are not completely transferred from the transfer member.

Thus, it is desirable that the transfer member surface has excellent release characteristics with respect to the toner particles. Conventional materials known in the art for use as transfer members often possess the strength, conformability and electrical conductivity necessary for use as transfer members, but can suffer from poor toner release characteristics, especially with respect to higher gloss image receiving substrates.

Polyimide substrate transfer members are suitable for high performance applications because of their outstanding mechanical strength and thermal stability, in addition to their good resistance to a wide range of chemicals. However, the high cost of manufacturing unseamed polyimide belts has led to the introduction of a seamed belt. Even polyimides with the best mechanical and chemical properties often exhibit poor adhesion at the seam even when commercially available primers are used.

In the electrostatic transfer applications, use of a seamed transfer polyimide member results in insufficient transfer in that the developed image occurring on the seam is not adequately transferred. This incomplete transfer is partially the result of the difference in seam height to the rest of the belt. A "bump" is formed at the seam, thereby hindering transfer and mechanical performance. The development of puzzle cut seams has increased the quality of transfer somewhat, by decreasing the seam height, thereby allowing smooth cycling. However, even with the improvements made with puzzle cut seams, quality imaging in the seamed area is not obtainable at present due, in part, to contrast in transfer caused by differences in electrical and release properties of the seam and the rest of the belt. These problems are sometimes caused by the adhesive. Further, current adhesives do not provide sufficient bonding strength at the seam, resulting in short belt life. In addition, the seam must have the appropriate surface properties in order to allow for sufficient toner release at the seam.

Therefore, it is desired to provide a belt having a seam, which has thermal and mechanical characteristics closely matching those of the robust substrate. Further, it is desired to provide a seam having electrical, mechanical and toner release characteristics that closely match those of the rest of the belt. In addition, it is desirable to provide a seam, which is imagable, thereby reducing or eliminating the presence of print or copy defects.

U.S. Pat. No. 5,549,193 relates to an endless flexible seamed belt comprising puzzle cut members, wherein at least one receptacle has a substantial depth in a portion of the belt material at the belt ends.

U.S. Pat. No. 5,721,032 discloses a puzzle cut seamed belt having a strength-enhancing strip.

U.S. Pat. No. 5,487,707 discloses a puzzle cut seamed belt having a bond between adjacent surfaces, wherein an ultraviolet cured adhesive is used to bond the adjacent surfaces.

U.S. Pat. No. 5,514,436 relates to a puzzle cut seamed belt having a mechanically invisible seam, which is substantially equivalent in performance to a seamless belt.

SUMMARY OF THE INVENTION

Embodiments of the present invention include: an endless seamed flexible belt comprising a first end and a second end, each of the first end and the second end comprising a plurality of mutually mating elements which join in an interlocking relationship to form a seam, said belt comprising a substrate having a fluoropolymer material coated over said seam.

In addition, embodiments of the present invention include: an endless seamed flexible belt comprising a first end and a second end, each of the first end and the second end comprising a plurality of mutually mating elements which join in an interlocking relationship to form a seam, the belt comprising a substrate having conductive fillers therein, and the seam comprising a fluoropolymer overcoat having conductive fillers therein.

Embodiments further include: an image forming apparatus for forming images on a recording medium comprising: a charge-retentive surface to receive an electrostatic latent image thereon; a development component to apply toner to the charge-retentive surface to develop the electrostatic latent image to form a developed image on the charge retentive surface; a transfer belt to transfer the developed image from the charge retentive surface to a copy substrate, wherein the transfer belt is an endless seamed flexible belt comprising a first end and a second end, each of the first end and the second end comprising a plurality of mutually mating elements which join in an interlocking relationship to form a seam, the transfer belt comprising a substrate having a fluoropolymer material coated over said seam; and a fixing component to fuse the developed image to the copy substrate.

BRIEF DESCRIPTION OF THE DRAWINGS

For a better understanding of the present invention, reference may be had to the accompanying figures.

DETAILED DESCRIPTION OF THE PRESENT INVENTION

The present invention relates to an endless flexible seamed belt having a puzzle cut seam, wherein the seam comprises a fluoropolymer overcoat. The fluoropolymer overcoat at the seam provides a seam, in embodiments, which is imagable and wherein the occurrence of copy and print defects at the seam is reduced or eliminated. The present invention further provides a belt wherein the seam and belt material share electrical, mechanical and toner release characteristics. The present invention further provides, in embodiments, a belt having virtual uniform thickness at the seam. The present invention, in embodiments, provides a seamed belt having enhanced bonding strength at the seam.

In preferred embodiments, the belt is an intermediate transfer belt, sheet, roller, or film useful in xerographic, including digital, apparatuses. However, the belts herein having a seam comprising a fluoropolymer overcoat, can be useful as belts, rollers, drelts, and the like, for many different processes and components such as photoreceptors, fusing members, transfix members, bias transfer members, bias charging members, developer members, image bearing members, conveyor members, cleaning members, and other members for contact electrostatic printing applications, xerographic applications, including digital, and the like. Further, the belts, herein, can be used for both liquid and powder xerographic architectures.

Figure 1:
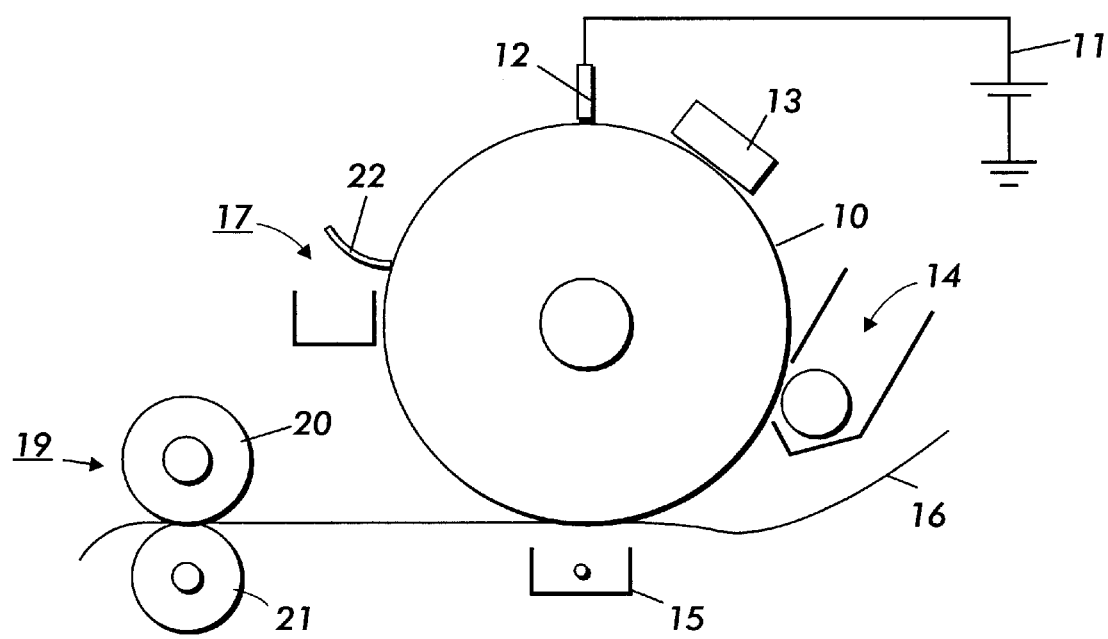
FIG. 1 is a depiction of an electrostatographic apparatus.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process.

After the toner particles have been deposited on the photoconductive surface, in image configuration, they are transferred to a copy sheet 16 by transfer means 15, which can be pressure transfer or electrostatic transfer. Preferably, the developed image can be transferred to an intermediate transfer member and subsequently transferred to a copy sheet.

After the transfer of the developed image is completed, copy sheet 16 advances to fusing station 19, depicted in FIG. 1 as fusing and pressure rolls, wherein the developed image is fused to copy sheet 16 by passing copy sheet 16 between the fusing member 20 and pressure member 21, thereby forming a permanent image. Fusing may be accomplished by other fusing members such as a fusing belt in pressure contact with a pressure roller, fusing roller in contact with a pressure belt, or other like systems. Photoreceptor 10, subsequent to transfer, advances to cleaning station 17, wherein any toner left on photoreceptor 10 is cleaned therefrom by use of a blade 22 (as shown in FIG. 1), brush, or other cleaning apparatus.

Figure 2:
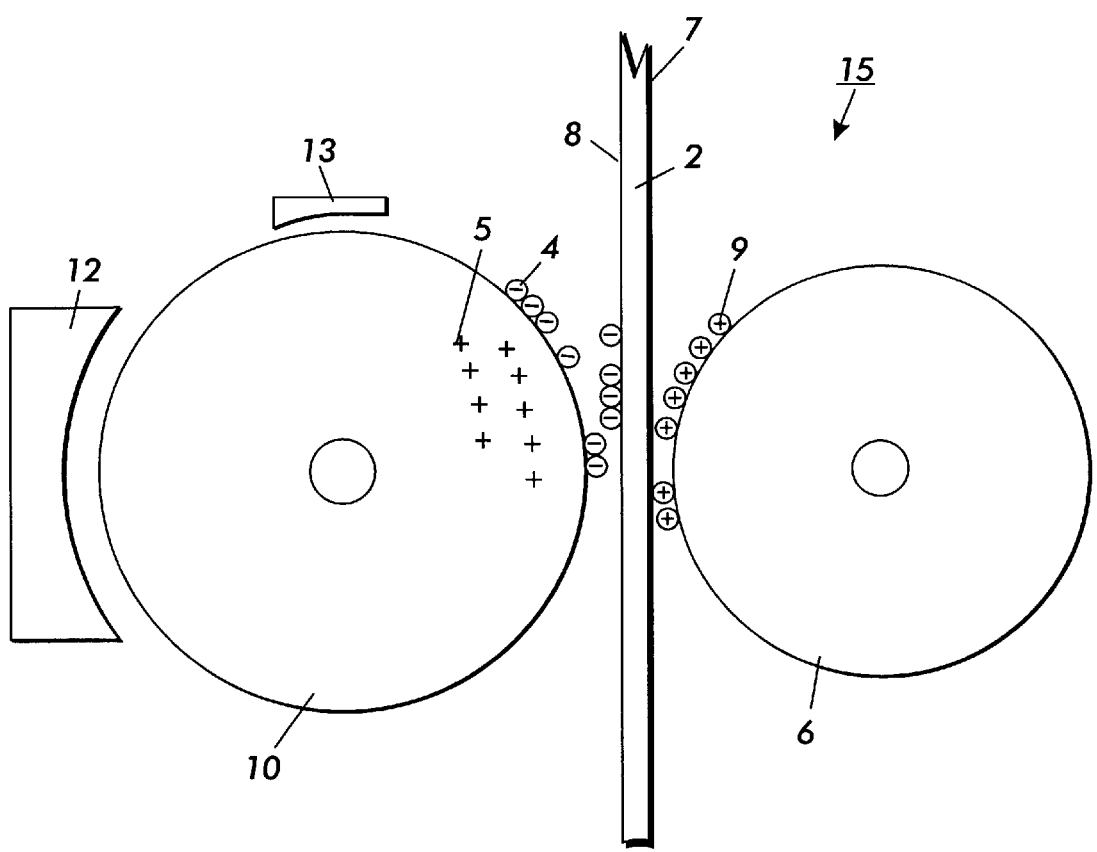
FIG. 2 is an enlargement of a transfer system according to an embodiment of the present invention.

FIG. 2 is a schematic view of an image development system containing an intermediate transfer member. FIG. 2 demonstrates another embodiment of the present invention and depicts a transfer apparatus 15 comprising a transfer member 1 positioned between an imaging member 10 and a transfer roller 6. The imaging member 10 is exemplified by a photoreceptor drum. However, other appropriate imaging members may include other electrostatographic imaging receptors such as ionographic belts and drums, electrophotographic belts, and the like.

In the multi-imaging system of FIG. 2, each image being transferred is formed on the imaging drum by image forming station 12. Each of these images is then developed at developing station 13 and transferred to transfer member 2. Each of the images may be formed on the photoreceptor drum 10 and developed sequentially and then transferred to the transfer member 2. In an alternative method, each image may be formed on the photoreceptor drum 10, developed, and transferred in registration to the transfer member 2. In a preferred embodiment of the invention, the multi-image system is a color copying system. In this color copying system, each color of an image being copied is formed on the photoreceptor drum. Each color image is developed and transferred to the transfer member 2. As above, each of the colored images may be formed on the drum 10 and developed sequentially and then transferred to the transfer member 2. In the alternative method, each color of an image may be formed on the photoreceptor drum 10, developed, and transferred in registration to the transfer member 2.

After latent image forming station 12 has formed the latent image on the photoreceptor drum 10 and the latent image of the photoreceptor has been developed at developing station 13, the charged toner particles 4 from the developing station 13 are attracted and held by the photoreceptor drum 10 because the photoreceptor drum 10 possesses a charge 5 opposite to that of the toner particles 4. In FIG. 2, the toner particles are shown as negatively charged and the photoreceptor drum 10 is shown as positively charged. These charges can be reversed, depending on the nature of the toner and the machinery being used. In a preferred embodiment, the toner is present in a liquid developer. However, the present invention, in embodiments, is useful for dry development systems also.

A biased transfer roller 6 positioned opposite the photoreceptor drum 10 has a higher voltage than the surface of the photoreceptor drum 10. As shown in FIG. 2, biased transfer roller 6 charges the backside 7 of transfer member 2 with a positive charge. In an alternative embodiment of the invention, a corona or any other charging mechanism may be used to charge the backside 7 of the transfer member 2.

The negatively charged toner particles 4 are attracted to the front side 8 of the transfer member 2 by the positive charge 9 on the backside 7 of the transfer member 2.

Figure 3:
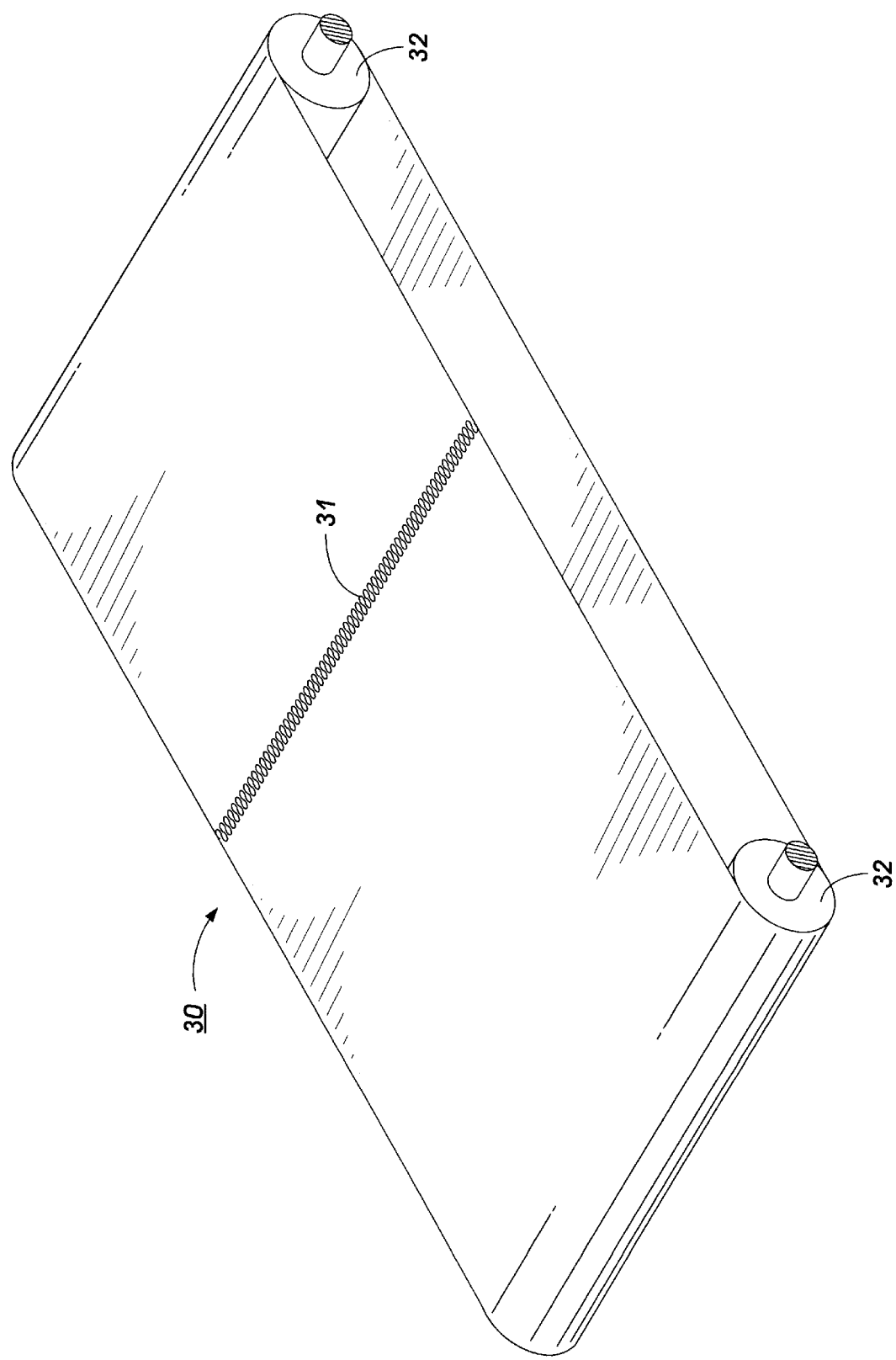
FIG. 3 is an enhanced view of an embodiment of a belt configuration and seam according to the present invention.

FIG. 3 demonstrates an example of an embodiment of a belt in accordance with the present invention. Belt 30 is demonstrated with seam 31. Seam 31 is pictured as an example of one embodiment of a puzzle cut seam. The belt is held in position and turned by use of rollers 32. Note that the mechanical interlocking relationship of the seam 31 is present in a two-dimensional plane when the belt 30 is on a flat surface, whether it be horizontal or vertical. While the seam is illustrated in FIG. 3 as being perpendicular to the two parallel sides of the belt, it should be understood that it may be angled or slanted with respect to the parallel sides. This enables any noise generated in the system to be distributed more uniformly and the forces placed on each mating element or node to be reduced.

The seam formed according to the present invention is one having a thin and smooth profile, of enhanced strength, improved flexibility and extended mechanical life. In a preferred embodiment, the belt ends are held together by the geometric relationship between the ends of the belt material, which are fastened together by a puzzle cut. The puzzle cut seam can be of many different configurations, but is one in which the two ends of the seam interlock with one another in a manner of a puzzle. Specifically, the mutually mating elements comprise a first projection and a second receptacle geometrically oriented so that the second receptacle on the first end receives the first projection on the second end and wherein the first projection on the first end is received by the second receptacle on the second end. The seam has a kerf, void or crevice between the mutually mating elements at the two joining ends of the belt, and that crevice can be filled with an adhesive according to the present invention. The opposite surfaces of the puzzle cut pattern are bound or joined together to enable the seamed flexible belt to essentially function as an endless belt. In the present invention, the seam including the puzzle cut members, is held together by a fluoropolymer adhesive, which is compatible with the rest of the belt. The belt, in embodiments, provides improved seam quality and smoothness with substantially no thickness differential between the seam and the adjacent portions of the belt.

Figure 4:
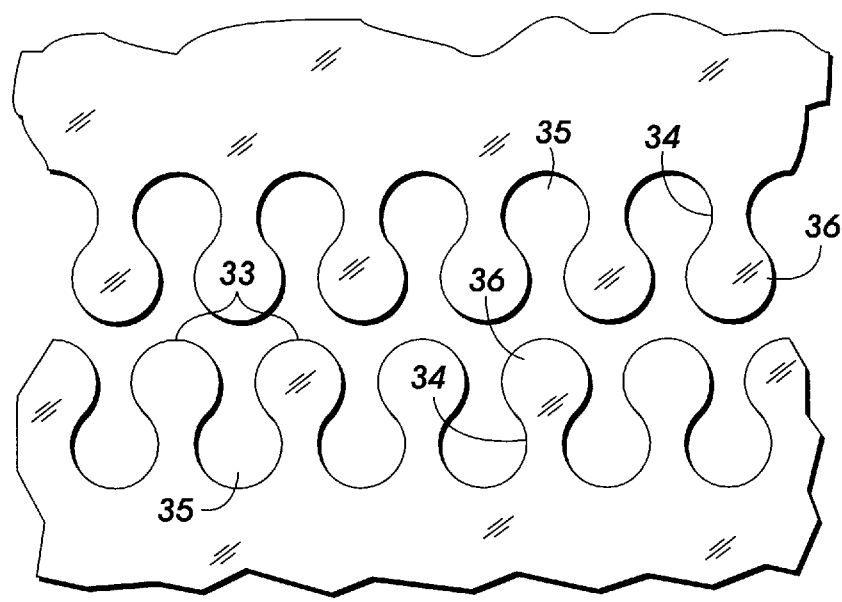
FIG. 4 is an enlargement of a puzzle cut seam having head and neck members according to one embodiment of the present invention.
Figure 5:
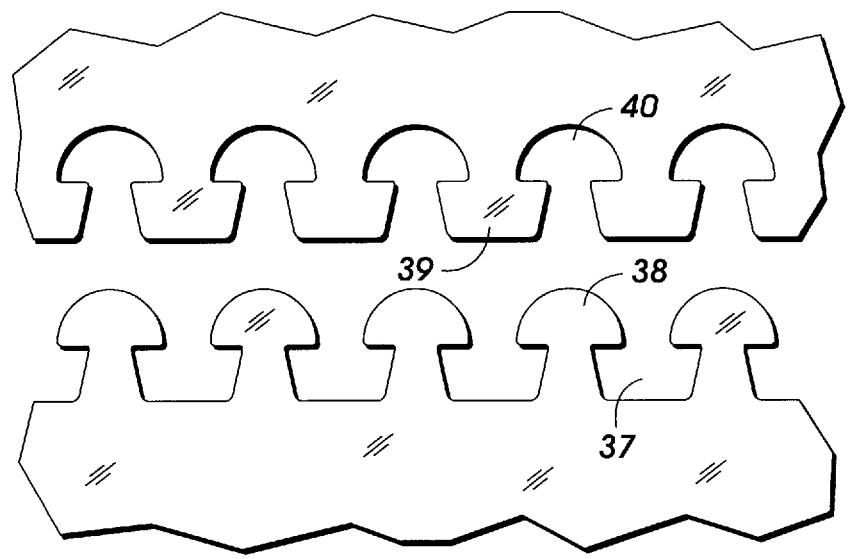
FIG. 5 is an enlargement of a puzzle cut seam having mushroom-shaped puzzle cut members according to another embodiment of the present invention.
Figure 6:
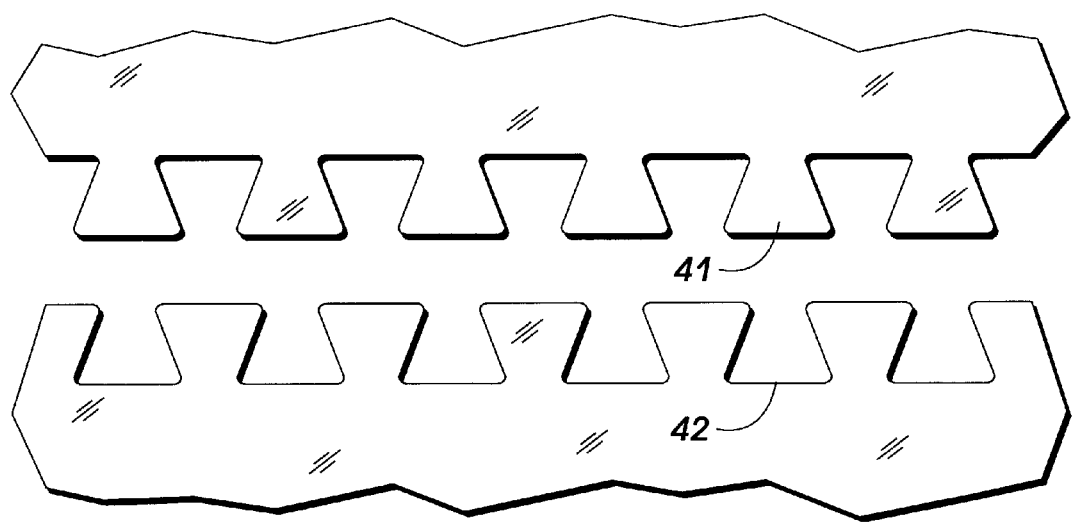
FIG. 6 is an enlargement of a puzzle cut seam having dovetail members according to another embodiment of the present invention.
Figure 7:
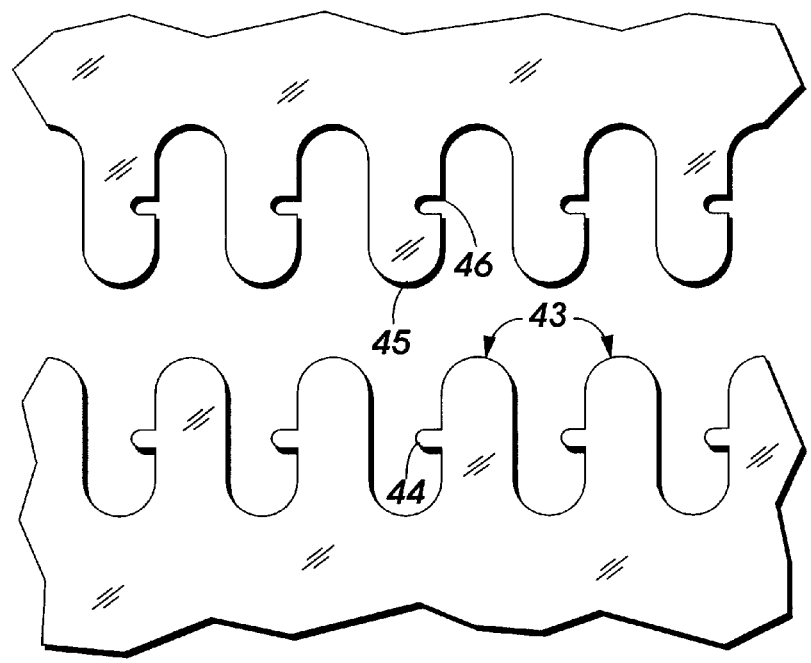
FIG. 7 is an enlargement of a puzzle cut seam having recessor and teeth members according to another embodiment of the present invention.

An example of an embodiment of a puzzle cut seam having two ends, each of the ends comprising puzzle cut members or mutually mating elements is shown in FIG. 4. The puzzle cut pattern may take virtually any form, including that of nodes such as identical post or neck 34 and head 33 or node patterns having projections 36 and receptacles 35 which interlock when brought together as illustrated in FIG. 4. The puzzle cut pattern may also be of a more mushroom-like shaped pattern having first projections 38 and 39 and second receptacles 40 and 37 as illustrated in FIG. 5, as well as a dovetail pattern as illustrated in FIG. 5 having first projections 41 and second receptacles 42. The puzzle cut pattern illustrated in FIG. 7 has a plurality of first fingers 43 with interlocking teeth 44 and plurality of second fingers 45 which have recesses 46 to interlock with the teeth 44 when assembled. It is preferred that the interlocking elements all have curved mating elements to reduce the stress concentration between the interlocking elements and permit them to separate when traveling around curved members such as the rolls 32 of FIG. 3. It has been found that with curved mating elements that the stress concentration is lower than with square corners where rather than the stress being uniformly distributed it is concentrated leading to possible failure.

Figure 8:
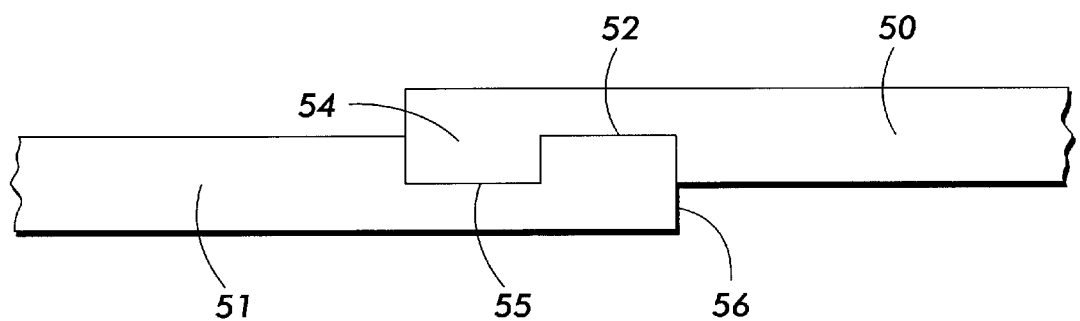
FIG. 8 is an enlargement of a puzzle cut seam having receptacle and projection members of differing depth according to another embodiment of the present invention.

Another example of a puzzle cut seam is shown in FIG. 8 in which the mutually mating elements or puzzle cut members comprise a first member 50 and a second member 51, wherein the first member 50 comprises a first receptacle 52 and a first projection 54, and the second member 51 comprises a second receptacle 55 and a second projection 56. The first receptacle 52 of the first member 50 receives the second projection 56 of the second member 51, and the second receptacle 55 of the second member 51 receives the first projection 54 of the first member 50. In order to reduce the height differential between the seamed portion and the adjacent, unseamed portion of the belt, it is desirable to have the second receptacles formed within their individual members at a substantial depth in a portion of the belt as the belt ends.

It is preferred that the height differential between the seam and the rest of the belt (the nonseamed portions of the belt) be practically nil, or from about 0 to about 25 micrometers, preferably from about 0.0001 to about 25 micrometers, and particularly preferred of from about 0.01 to about 15 micrometers.

Figure 9:
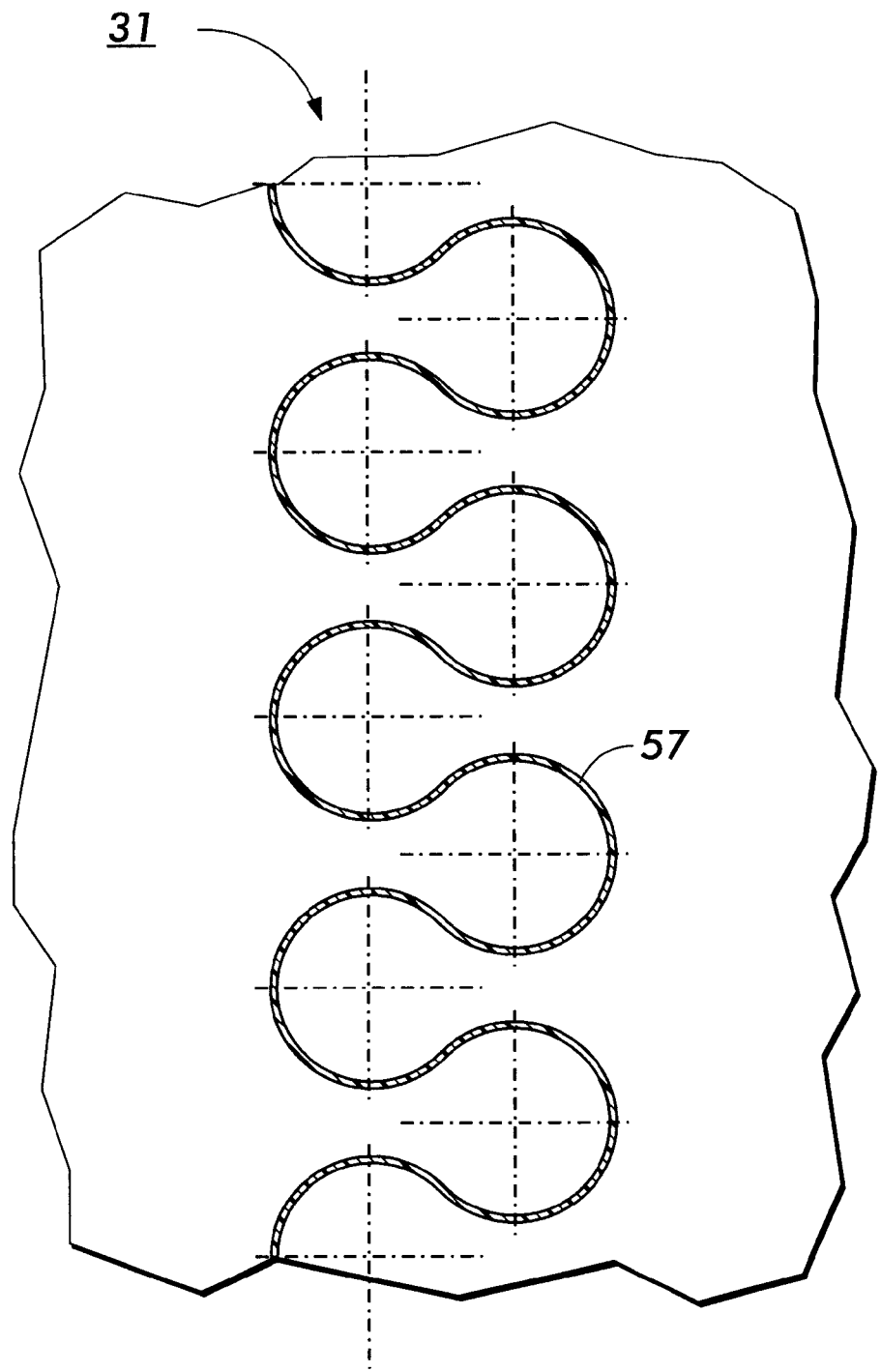
FIG. 9 is an enlarged version of a belt according to one embodiment of the present invention and demonstrates a crevice between the puzzle cut members, the crevice containing an adhesive.

As shown in one embodiment of a puzzle cut seam 31 according to the present invention, an adhesive is present between the puzzle cut members and at the seam crevice 57 of FIG. 9. In a preferred embodiment, the adhesive is a fluoropolymer adhesive. However, other suitable adhesives can be used, such as, for example, ultraviolet-curable adhesives and epoxy adhesives. In a particularly preferred embodiment, overcoat comprises a fluoropolymer material.

The fluoropolymer useful as the overcoat material for the belt seam is preferably chosen to have a resistivity within the range desired for electrostatic transfer of toner. Preferably, the resistivity of the seam is the same or similar to that of the belt in order to provide the same electrical properties for the seam and the rest of the belt. A preferred resistivity range for toner transfer performance is from about $10^2$ to about $10^{15}$ ohms/sq, preferably from about $10^8$ to about $10^{13}$ ohms/sq. A preferred volume resistivity is from about $10^9$ to about $10^{11}$ ohms-cm. When the belt and the seam of the belt have a same or substantially the same electrical resistance, the toner transfer at the seam is the same or substantially the same as the transfer at the belt. Such transfer at the seam provides an invisible or substantially invisible seam.

The electrical properties of the belt and/or seam can be controlled by varying the amount of fillers, by changing the type of filler added, and/or by changing the curing procedure. By tailoring the conductivity of the seam region to match that of the entire belt, images with little or no loss of print quality at the seam can be achieved.

A preferred overcoat material for use with a belt seam, preferably a puzzle cut belt seam, is a fluoropolymer material, and in preferred embodiments, a semiconductive fluoropolymer material.

Preferred fluorpolymers include fluoroethylene vinyl ether based-polymers, such as polyfluoroethylene vinyl ether and a specifically preferred example is chlorotrifluoroethylene vinyl ether; tetrafluoroethylene or polymers thereof; vinylidene fluoride or polymers thereof; hexafluoropropylene or polymers thereof; fluorinated ethylene-propylene copolymer; perfluorinated polyether; fluorinated urethane; fluorinated acrylic; and like fluoropolymers. Particularly preferred fluoropolymers includes copolymers of polyfluoroethylene and vinyl ether, and particularly tetrafluoroethylene and vinyl ether, and also include fluorinated acrylic. Other preferred fluoropolymers include copolymers or terpolymers of tetrafluoroethylene, hexafluoropropylene and vinylidene fluoride, and further include a tetrapolymer of tetrafluoroethylene, hexafluoropropylene, vinylidene fluoride, and a cure site monomer. Commercially available fluoropolymers include FLUORAD FC280®, FLUORAD® 725 and FLUORAD® 722, all from 3M Company; fluoropolymers having the trademark LUMIFLON® (particularly preferred are the LUMIFLON® 200 series, 400 series and 600 series) from Zeneca; FLOMBLINS® and FLUOROBASE® from Ausimont; FLUORATE® from Dainippon and ZAFLON® from Toa Gosei; KYNAR® from Ato Chem; terpolymers of tetrafluoroethylene, hexafluoropropylene and vinylidene fluoride, and also polyfluoroalkyl from Dyneon; and those fluoropolymers having the tradename TEFLON®, such as polytetrafluoroethylene, fluorinated ethylene propylene, and polyfluoroalkyl from DuPont.

It is preferred to add fillers to the belt substrate and/or adhesive at the seam and/or to the overcoat so as to impart desired electrical resistivity. Examples of suitable fillers for use herein include carbon fillers, metal oxide fillers, doped metal oxide fillers, other metal fillers, other conductive fillers, and the like. Specific examples of fillers include carbon fillers such as carbon black, fluorinated carbon black, graphite, low conductive carbon, and the like, and mixtures thereof; metal oxides such as indium tin oxide, zinc oxide, iron oxide, aluminum oxide, copper oxide, lead oxide, and the like, and mixtures thereof; doped metal oxides such as antimony-doped tin oxide, antimony-doped titanium dioxide, aluminum-doped zinc oxide, similar doped metal oxides, and mixtures thereof; and polymer particles such as polytetrafluoroethylene, polypyrrole, polyaniline, doped polyaniline and the like, and mixtures thereof. Preferred commercially available fillers include fluorinated carbon such as ACCUFLUOR® from Allied Signal of Morristown, N.J.; ZELEC® (antimony doped tin oxide) available from DuPont of Wilmington, Del.; Baytrone® P, and Baytron® M (the Baytron® polymers contain polyethylendioxythiophene) available from Bayer Corporation, Pittsburgh, Pa.

Preferred fluorinated carbons include those having the formula $CF_x$ with x representing the number of fluorine atoms and generally being up to about 1.5, preferably from about 0.01 to about 1.5, and particularly preferred from about 0.04 to about 1.4. Other preferred fluorinated carbons are poly(dicarbon monofluoride) which is usually written in the shorthand manner $(C_2F)_n$. Preferred fluorinated carbons include those described in U.S. Pat. No. 4,524,119 to Luly et al., the subject matter of which is hereby incorporated by reference in its entirety, and those having the tradename ACCUFLUOR®, (ACCUFLUOR® is a registered trademark of Allied Signal, Morristown, N.J.) for example, ACCUFLUOR® 2028, ACCUFLUOR® 2065, ACCUFLUOR® 1000, and ACCUFLUOR® 2010. ACCUFLUOR® 2028 and ACCUFLUOR® 2010 have 28 and 11 percent by weight fluorine, respectively, based on the weight of fluorinated carbon. ACCUFLUOR® 1000 and ACCUFLUOR® 2065 have 62 and 65 percent by weight fluorine, respectively, based on the weight of fluorinated carbon. Also, ACCUFLUOR® 1000 comprises carbon coke, whereas ACCUFLUOR® 2065, 2028 and 2010 all comprise conductive carbon black. These fluorinated carbons are of the formula $CF_x$ and are formed by the reaction of $C+F_2=CF_x$.

Preferably, the filler, if present in the substrate, is present in an amount of from about 1 to about 60, and preferably from about 2 to about 40 percent by weight of total solids. Total solids, as used herein, refers to the amount of solids present in the substrate or overcoat. The filler, if present in the overcoat, is preferably present in an amount of from about 5 to about 30 percent by weight of total solids. Fillers can also be present, in preferred embodiments, in the adhesive at the seam.

It is preferable to add a crosslinker to the fluoropolymer overcoat material prior to coating the fluoropolymer overcoat onto the belt substrate. Examples of suitable crosslinkers include isocyanates and amino crosslinkers such as RESIMENE®.

It is preferred to filter the overcoat solution by passing the solution through a millipore vacuum filter to give a fine dispersed solution prior to overcoating the belt with the fluoropolymer overcoat solution.

The fluoropolymer overcoat may be applied over a partial or entire region of the belt, or may be applied only at the seam region of the belt. In the embodiment wherein the overcoat is applied at the seam region only, it is preferred that an optional second layer coating be applied to cover the entire belt region. Preferred coating materials for such an optional second overcoat include materials which reduce the surface energy of the belt. Examples of suitable optional second overcoat materials include fluoropolymers such as polytetrafluoroethylene or perfluoroalcrylic polymers. The fluoropolymer overcoat solution may be applied by any suitable means such as dip coating, flow coating, roll coating, spray coating or like coating methods. In an embodiment wherein the overcoat is applied over the entire belt, the overcoat is applied to the entire belt to a thickness of from about 1 to about 120 microns, and preferably from about 20 to about 75 microns. In an embodiment wherein the overcoat is applied only at the seam region of the belt, the overcoat is applied to a thickness of from about 2 to about 10 microns.

After the overcoat is applied, the overcoat can then be cured by various methods. Curing procedures useful in curing the overcoat include forced air over cure, ultraviolet cure, moisture cure, and like known methods. Examples of heat curing include use of moderate heat once the overcoat is coated on the substrate. This moderate heating also increases the crosslinking/solidification reaction and increases the seam processing and belt fabrication speed. Desired curing temperatures include from about 40 to about 250° C., and preferably from about 100 to about 200° C. Curing can be effected at a time of from about 30 seconds to about 10 hours, preferably from about 30 minutes to about 5 hours, and particularly preferred, about 1 hour. Heat may be applied by, for example, an oven, or other suitable means.

Figure 10:
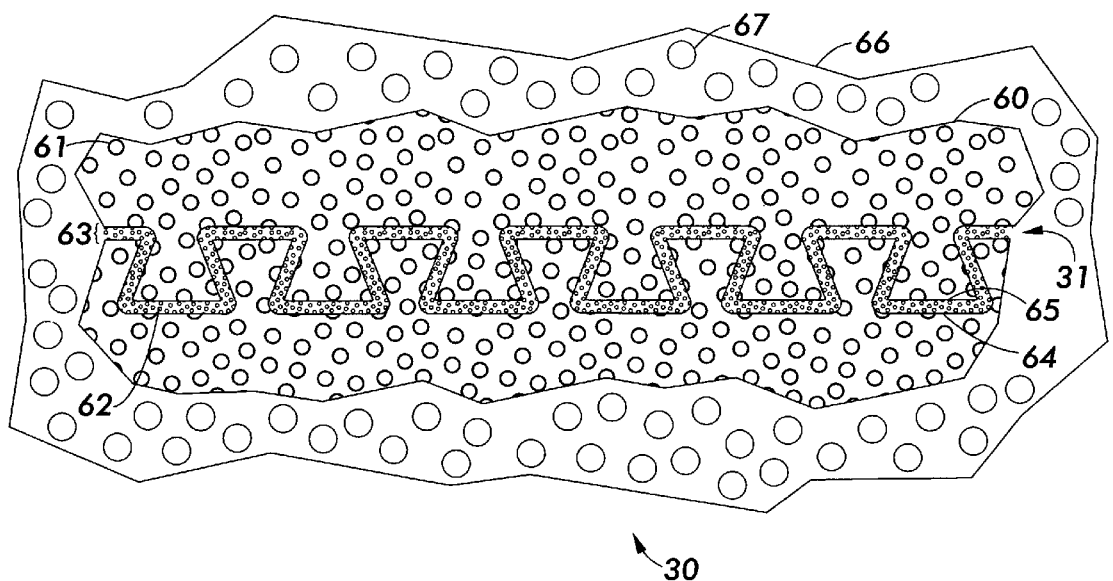
FIG. 10 is an enlarged cross-sectional view of a belt according to a preferred embodiment of the invention.

An example of a preferred belt used in combination with the fluoropolymer overcoat is depicted in FIG. 10. The belt 30 comprises a substrate 60, having therein, in preferred embodiments, conductive fillers 61. The belt contains seam 31 having an adhesive 63 positioned between the seam members 64 and 65. In a preferred embodiment, conductive fillers 62 are dispersed or contained in the fluoropolymer adhesive. A fluoropolymer overcoat 66 is provided in the substrate 60. The overcoat may contain conductive fillers 67. Conductive fillers 61 optionally dispersed or contained in the substrate, fillers 67 optionally contained in the overcoat, and fillers 62 optionally contained or dispersed in the adhesive, may be the same or different.

Examples of suitable substrate materials include polyimides such as polyaniline polyimide, polycarbonates, and the like. Examples of commercially available polyimide substrates include KAPTON® from DuPont, UPILEX® from DuPont, ULTEM® from General Electric, and the like. In a preferred embodiment, the substrate contains a conductive filler such as those set forth above, including carbon fillers, metal oxide fillers, doped metal oxide fillers, other conductive fillers, and the like.

The fluoropolymer overcoat provides an excellent seam overcoat for belts, and in preferred embodiments, polyimide intermediate transfer belts. The fluoropolymer overcoat, in embodiments, has the same or similar mechanical and surface release properties as the substrates. Further, the fluoropolymer overcoat, in embodiments, enhances the bonding strength of the substrate seam members. The resistivity of the adhesives can be tuned into the same range as the substrate by changing the loading level of the conductive filler in the overcoat, by mixing different ratios of the conductive fillers and dispersing them in the overcoat, or by varying curing conditions of the overcoat.

All the patents and applications referred to herein are hereby specifically, and totally incorporated herein by reference in their entirety in the instant specification.

The following Examples further define and describe embodiments of the present invention. Unless otherwise indicated, all parts and percentages are by weight.

EXAMPLES

Example 1

Preparation of Intermediate Transfer Belt

A polyimide intermediate transfer belt was obtained from DuPont. The belt substrate comprised polyaniline-doped polyimide. The resistivity was tested and found to be from about $10^{12}$ to about $10^{13}$ ohm/sq.

Example 2

Preparation of Fluoropolymer Adhesive Seam

A fluoropolymer adhesive was prepared by mixing about 20 grams fluoropolymer resin with about 1 gram isocyanate (DESMODUR® N3300 from Monsanto). Three different adhesive solutions were prepared using one of the fluoropolymers LUMIFLON® 200, 400 and 600 from Zeneca Resin. The adhesive solution was roll milled for about 30 minutes. Subsequent to the roll milling, the adhesive solution was dried at about 30° C. in a forced air oven for about 1 hour and post cured at approximately 100° C. for about 30 minutes.

Example 3

Preparation of Fluorinated Carbon-Filled Fluoropolymer Adhesive

About 20 grams of LUMIFLON® 200 was mixed with about 0.3 grams RESIMENE® 747 from Solutia. About 1 gram of fluorinated carbon (ACCUFLUOR® 2028 or 2010 from Advanced Research Chemicals) was mixed with about 20 grams methyl ethyl ketone on a roll mill for about 30 minutes. Subsequently, about 0.005 grams of a catalyst solution (P-TSA from Aldrich) was mixed with about 20 grams methyl ethyl ketone. The final adhesive solution was well mixed on a roll mill and applied to a puzzle cut interlock seam of the polyimide substrate of Example 1. The film was then dried at about 30° C. for about 20 minutes and cured for about 30 minutes at a temperature of approximately 150° C.

Example 4

Preparation of Fluorinated Carbon-filled Fluoropolymer Overcoat

A fluorinated carbon-filled fluoropolymer adhesive solution was prepared as in Example 3. However, instead of providing the conductive fluoropolymer solution to a seam, the solution was applied on a seamed substrate to form a smooth, glossy film. The film was then dried at about 30° C. for about 20 minutes and cured at about 150° C. for about 30 minutes.

Example 5

Preparation of Fluoropolymer Overcoat

About 20 grams of a fluoropolymer resin (LUMIFLON® 200 from Zeneca Resin) was mixed with about 0.005 grams P-TSA from Aldrich, about 20 grams methyl ethyl ketone and about 0.3 grams RESIMENE® 747 from Solutia. The coating solution was mixed under a roll mill for about 30 minutes and then coated on seamed substrates.

Example 6

Preparation of Crosslinked Fluoropolymer Overcoat

About 20 grams resin (LUMIFLON® 200, 610, 400 or 9200 from Zeneca Resin) was mixed with about 1 gram isocyanate crosslinker (DESMODUR® N3300 from Bayer Corporation) or 0.3 grams R757, R747, or the like, from Solutia. The coating solution was mixed under a roll mill for about 30 minutes and then coated on seamed substrates.

The overcoated belt was then tested by an in-house transfer fixture. The surface of the overcoat belt was shown to have better cleaning ability than a non-overcoated polyimide substrate belt. In addition, the overcoated belt was shown to have a relatively low friction to the cleaning blade. Moreover, with the overcoated belt, approximately 98 percent of the toner transferred off the coated belt.

Pull force tests were also performed and the results demonstrated that with the overcoated belts, the strength of the overcoat seamed belts increased from about 15 lbs/inch to about 18 lbs/inch, which is an approximate 20 percent increase over the non-overcoated polyimide substrate belt.

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

We claim:

1. An endless seamed flexible belt comprising a first end and a second end, each of said first end and said second end comprising a plurality of mutually mating elements which join in an interlocking relationship to form a seam, said belt comprising a substrate having a fluoropolymer material coated over said seam.

2. An endless seamed flexible belt in accordance with claim 1, wherein said fluoropolymer material comprises a conductive filler.

3. An endless seamed flexible belt in accordance with claim 2, wherein said filler is selected from the group consisting of carbon fillers, doped metal oxide fillers, and polymer fillers.

4. An endless seamed flexible belt in accordance with claim 3, wherein said carbon fillers are selected from the group consisting of carbon, graphite, and fluorinated carbon.

5. An endless seamed flexible belt in accordance with claim 4, wherein said carbon filler is fluorinated carbon.

6. An endless seamed flexible belt in accordance with claim 3, wherein said doped metal oxide fillers are selected from the group consisting of antimony-doped tin oxide, antimony-doped titanium dioxide, and aluminum-doped zinc oxide.

7. An endless seamed flexible belt in accordance with claim 3, wherein said polymer fillers are selected from the group consisting of polytetrafluoroethylene, polypyrrole, and polyaniline.

8. An endless seamed flexible belt in accordance with claim 1, wherein said fluoropolymer material is selected from the group consisting of fluoroethylene vinyl ether polymers, tetrafluoroethylene polymers, hexafluoropropylene polymers, vinylidene fluoride polymers, fluorinated ethylene-propylene copolymers, perfluorinated polyether, fluorinated urethane, fluorinated acrylic, and mixtures thereof.

9. An endless seamed flexible belt in accordance with claim 8, wherein said fluoropolymer material is selected from the group consisting of polyfluoroethylene vinyl ether and fluorinated acrylic.

10. An endless seamed flexible belt in accordance with claim 9, wherein said polyfluoroethylene vinyl ether is chlorotrifluoroethylene vinyl ether.

11. An endless seamed flexible belt in accordance with claim 1, wherein said substrate comprises a polyimide.

12. An endless seamed flexible belt in accordance with claim 11, wherein said polyimide is polyaniline polyimide.

13. An endless seamed flexible belt in accordance with claim 1, wherein said seam has a resistivity of from about $10^2$ to about $10^{15}$ ohms/sq.

14. An endless seamed flexible belt in accordance with claim 13, wherein said resistivity is from about $10^8$ to about $10^{13}$ ohm/sq.

15. An endless seamed flexible belt in accordance with claim 1, wherein said belt and said seam both have a resistivity of from about $10^8$ to about $10^{13}$ ohm/sq.

16. An endless seamed flexible belt in accordance with claim 1, wherein said substrate comprises a conductive filler.

17. An endless seamed flexible belt in accordance with claim 16, wherein said filler is selected from the group consisting of carbon fillers, doped metal oxide fillers, and polymer fillers.

18. An endless seamed flexible belt in accordance with claim 17, wherein said carbon fillers are selected from the group consisting of carbon, graphite, and fluorinated carbon.

19. An endless seamed flexible belt in accordance with claim 18, wherein said carbon filler is a fluorinated carbon.

20. An endless seamed flexible belt in accordance with claim 17, wherein said doped metal oxide fillers are selected from the group consisting of antimony-doped tin oxide, antimony-doped titanium dioxide, and aluminum-doped zinc oxide.

21. An endless seamed flexible belt in accordance with claim 17, wherein said polymer fillers are selected from the group consisting of polytetrafluoroethylene, polypyrrole, and polyaniline.

22. An endless seamed flexible belt in accordance with claim 1, wherein said belt comprises a second coating on said fluoropolymer material coated on said seam.

23. An endless seamed flexible belt in accordance with claim 22, wherein said second coating comprises a fluoropolymer.

24. An endless seamed flexible belt in accordance with claim 1, wherein said fluoropolymer material is coated over an entire length of said belt and including said seam.

25. An endless seamed flexible belt in accordance with claim 1, wherein said belt is an intermediate transfer belt.

26. An endless seamed flexible belt in accordance with claim 1, wherein said plurality of mutually mating elements are in the form of a puzzle cut pattern.

27. An endless seamed flexible belt in accordance with claim 26, wherein said mutually mating elements comprise a first projection and a second receptacle geometrically oriented so that said second receptacle on the first end receives the first projection on the second end and wherein said first projection on said first end is received by said second receptacle on the second end to form a joint between the first and second ends.

28. An endless seamed flexible belt in accordance with claim 27, wherein said first projection and said second receptacle are curved.

29. An endless seamed flexible belt comprising a first end and a second end, each of said first end and said second end comprising a plurality of mutually mating elements which join in an interlocking relationship to form a seam, said belt comprising a substrate having conductive fillers therein, and said seam comprising a fluoropolymer overcoat having conductive fillers.

30. An image forming apparatus for forming images on a recording medium comprising:

a charge-retentive surface to receive an electrostatic latent image thereon;

a development component to apply toner to said charge-retentive surface to develop said electrostatic latent image to form a developed image on said charge retentive surface;

a transfer belt to transfer the developed image from said charge retentive survace to a copy substrate, wherein said transfer belt is an endless seamed flexible belt comprising a first end and a second end, each of said first end and said second end comprising a plurality of mutually mating elements which join in an shocking relationship to form a seam, the transfer belt comprising a substrate having a fluoropolymer material coated over said seam; and a fixing component to fuse said developed image to said copy substrate.

* * * * *